United States Patent
Herbstritt

(10) Patent No.: US 6,826,952 B1
(45) Date of Patent: Dec. 7, 2004

(54) MULTIPLE TANK LEVEL INDICATION SYSTEM AND METHOD

(75) Inventor: Dale R. Herbstritt, Clemmons, NC (US)

(73) Assignee: Ingersoll-Rand Company, Woodcliff Lake, NJ (US)

( * ) Notice: Subject to any disclaimer, the term of this patent is extended or adjusted under 35 U.S.C. 154(b) by 0 days.

(21) Appl. No.: 10/639,156

(22) Filed: Aug. 11, 2003

(51) Int. Cl.$^7$ ............................................. G01F 17/00
(52) U.S. Cl. ................................... 73/149; 73/290 R
(58) Field of Search .................. 73/149, 290 R; 364/509

(56) References Cited

U.S. PATENT DOCUMENTS

| | | | |
|---|---|---|---|
| 4,044,355 A | * 8/1977 | Edvardsson | ................ 342/124 |
| 4,102,191 A | 7/1978 | Harris | |
| 4,146,834 A | * 3/1979 | Maltby et al. | ............. 324/610 |
| 4,178,802 A | 12/1979 | Yamamoto | |
| 4,352,159 A | * 9/1982 | Colby | ........................ 702/52 |
| 4,355,363 A | * 10/1982 | Colby et al. | ................ 702/52 |
| 4,451,894 A | * 5/1984 | Dougherty et al. | .......... 702/52 |
| 4,671,121 A | 6/1987 | Schieler | |
| 4,724,705 A | 2/1988 | Harris | |
| 4,796,471 A | * 1/1989 | Sabin | ........................ 73/295 |
| 5,666,851 A | 9/1997 | Bacon | |
| 5,697,248 A | * 12/1997 | Brown | ..................... 73/290 V |
| 6,002,328 A | 12/1999 | Wallrafen | |
| 6,397,674 B1 | 6/2002 | Kerchaert et al. | |
| 6,424,924 B1 | 7/2002 | Wagner et al. | |
| 2001/0032506 A1 | 10/2001 | Keller | |

* cited by examiner

*Primary Examiner*—Hezron Williams
*Assistant Examiner*—Rodney Frank
(74) *Attorney, Agent, or Firm*—Michael Best & Friedrich LLP

(57) ABSTRACT

Systems and methods that measure the total capacity for a plurality of storage tanks. Methods according to this aspect of the invention start with deriving a weighting factor for each one of the plurality of storage tanks, determining an overall transmitter resistance for the total capacity measurement, and multiplying each one of the storage tank weighting factors with the overall resistance yielding a span resistance corresponding to each one of the plurality of storage tanks. The method further includes coupling a transmitter mounted on each one of the plurality of storage tanks in a series loop whereby each transmitter has the span resistance corresponding to the tank mounted thereon and deriving a weighting factor includes adding the capacities of all of the plurality of storage tanks as a sum total capacity and dividing each storage tank capacity from the plurality of storage tanks by the sum total capacity.

8 Claims, 2 Drawing Sheets

MULTIPLE TANK LEVEL INDICATION SYSTEM AND METHOD

BACKGROUND

The invention relates generally to the field of level instrumentation and measurement. More specifically, embodiments of the invention relate to systems and methods for measuring the total capacity of a plurality of storage tanks sharing a common discharge header.

Many different ways exist to measure and indicate the level or volume of a storage tank. The instrumentation chosen is typically dependent upon the type of material being stored.

If the material is a bulk solid, such as a grain or coal, a vessel or container can be weighed using mechanical scales or an electronic strain gauge, subtracting the tare and converting the known weight to volume. A level instrument relying upon ultrasonics can be employed to gauge the height of the material thereby yielding level and concomitantly volume. Other schemes in the art exist as well.

The two described methods can be applied to liquids in storage tanks. Measuring liquids allows other instrumentation methods to be used such as level transmitters using floats and displacers, and differential pressure transmitters measuring hydrostatic head. All process instrumentation transmitters usually output a signal proportional to the measured parameter when coupled to an instrument loop for local and remote indication and process control.

Measuring the capacity of two or more storage tanks when piped together with a common discharge header can be accomplished using one level instrument, but under careful consideration. Good engineering practice requires separate instrumentation for each tank in light of discharge block valves that can be closed if a tank is removed from service, or if the type of level instrumentation used can lead to operator error. For example, shown in FIG. 1 are two storage tanks coupled together located at different elevations sharing a common discharge. If one float type level transmitter with remote indication is employed on the bottom tank, a full supply will be indicated even when the upper tank is emptied.

SUMMARY

The inventors have discovered that it would be desirable to have systems and methods to properly measure the overall capacity of a plurality of storage tanks.

One aspect of the invention provides a method of measuring total capacity for a plurality of storage tanks. Methods according to this aspect of the invention start with deriving a weighting factor for each one of the plurality of storage tanks, determining an overall transmitter resistance for the total capacity measurement, and multiplying each one of the storage tank weighting factors with the overall resistance yielding a span resistance corresponding to each one of the plurality of storage tanks.

The method further includes coupling a transmitter mounted on each one of the plurality of storage tanks in a series loop whereby each transmitter has the span resistance corresponding to the tank mounted thereon and deriving a weighting factor includes adding the capacities of all of the plurality of storage tanks as a sum total capacity and dividing each storage tank capacity from the plurality of storage tanks by the sum total capacity.

The system includes a transmitter mounted on each one of the plurality of storage tanks for measuring a respective storage tank capacity, an overall span resistance, a corresponding weighting factor applied to each transmitter to determine a transmitter span resistance, and a power supply and indicator coupled in series with each of the transmitters whereby total storage tank capacity is measured using each of the transmitter span resistances wherein all of the span resistances equal the overall span resistance. Each of the corresponding weighting factors is determined by a respective storage tank capacity divided by a sum total of all of the plurality of storage tank capacities.

Other objects and advantages of the systems and methods will become apparent to those skilled in the art after reading the detailed description of the preferred embodiments.

DETAILED DESCRIPTION OF THE PREFERRED EMBODIMENTS

Embodiments of the invention will be described with reference to the accompanying drawing figures wherein like numbers represent like elements throughout. The invention is taught using two tanks storing liquid. However, the invention is not limited by this example and can be applied to other applications requiring more than two storage tanks. Further, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "mounted," "connected," and "coupled" are used broadly and encompass both direct and indirect mounting, connecting, and coupling. Further, "connected" and "coupled" are not restricted to physical or mechanical connections or couplings.

Figure 1:
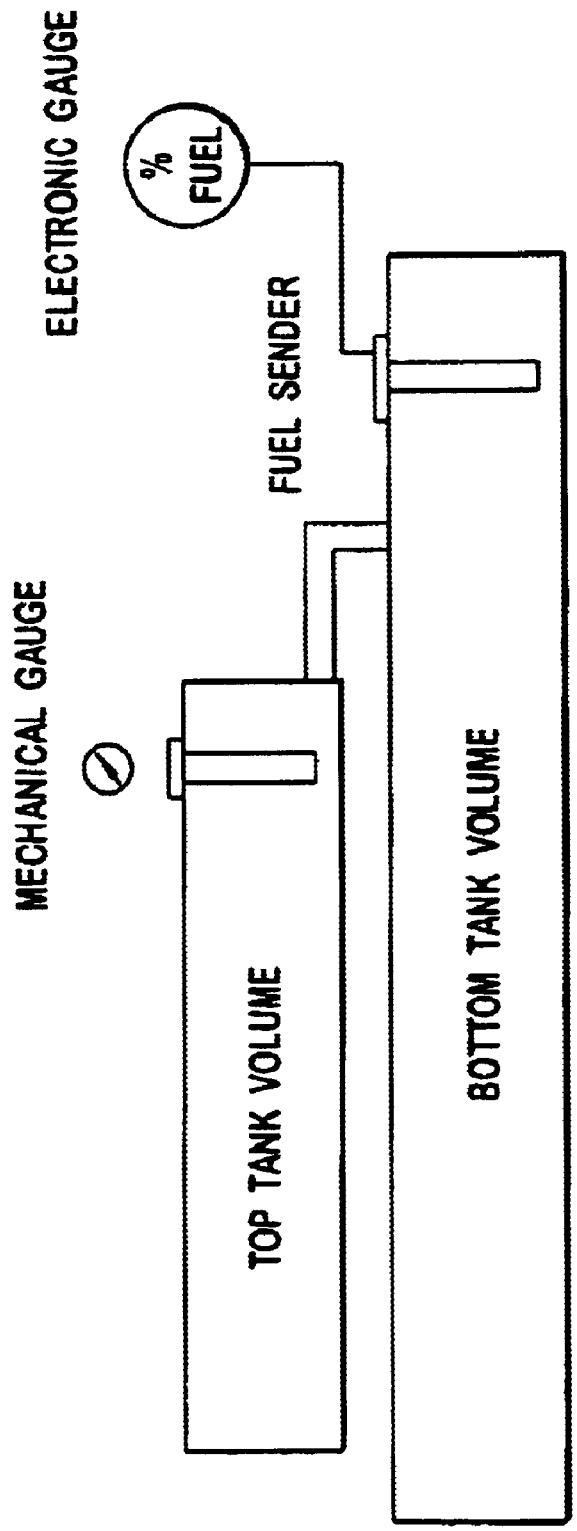
FIG. 1 is a prior art level instrumentation loop for monitoring the liquid level of two storage tanks.
Figure 2A:
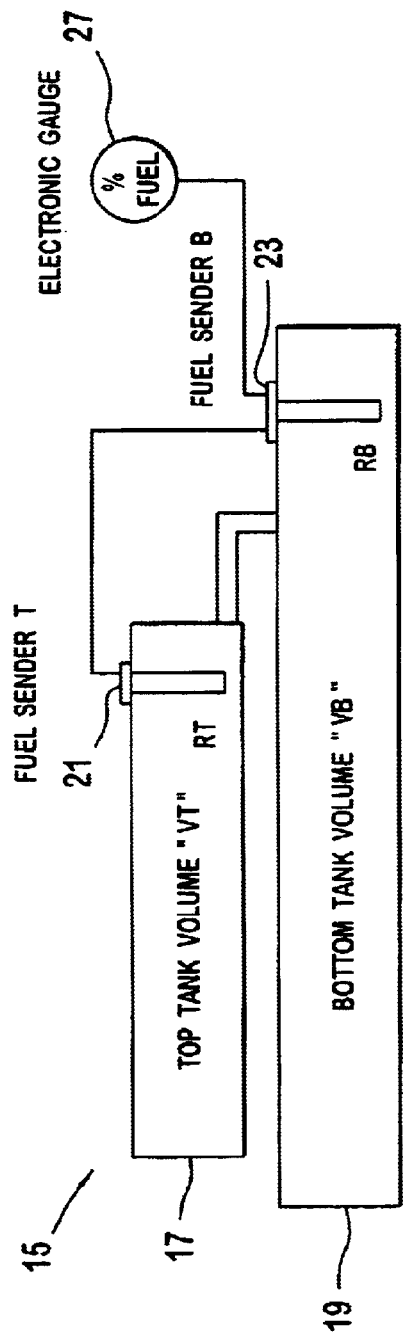
FIGS. 2a and 2b illustrate an exemplary embodiment of an instrumentation loop employing two level transmitters for monitoring two storage tanks.
Figure 2B:
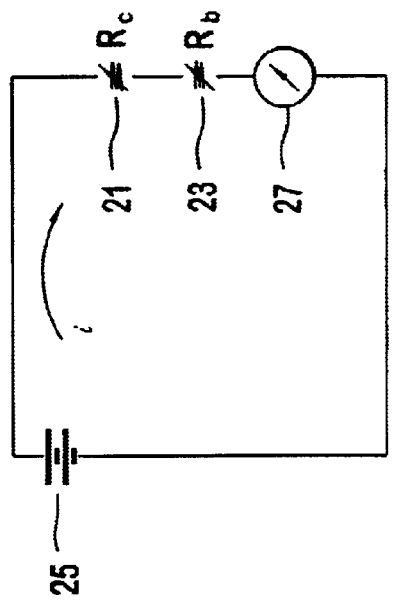

Shown in FIGS. 2a and 2b is one embodiment 15 of the invention. The invention allows for measuring the total liquid level or volume contained in a plurality of storage tanks located at different elevations. A top storage tank 17 and a bottom storage tank 19 are arranged in a series mechanical configuration at different elevations. Two float-type level transmitters, a top transmitter 21 and a bottom transmitter 23, are installed on top of each tank body for measuring liquid level and are coupled in a series loop i to a power supply 25 and a remote indicator 27 for display as shown in FIG. 2b.

By way of background, a level transmitter is a process instrument having a calibrated span defined by process variable minimum and maximum limits. The minimum and maximum limits, and values in-between are translated into a signal representing the span. The output signal can be a linear representation or a curve if there are peculiarities in the measured process. For example, if a tank is of irregular shape and volume with respect to height, the output signal can be contoured to linearize the output signal for linear indication and predictable process control.

Most transmitters provide a variable resistance as an output corresponding to the process variable they are measuring. For example, for a particular storage tank, a calibrated instrument span of 170 Ω can correspond to level from 0 to 50 inches, and when converted, indicate 0 to 20 gallons. The minimum limit (0 inches-0 gallons) is usually 10 Ω for maintaining a known resistance rather than zero to show instrument failures in an instrument loop as an under-range indication on a remote indicator. The same applies if the instrumentation were to over-range (>170 Ω). The maximum limit (50 inches-20 gallons) would therefore be 180 Ω. A level transmitter is coupled in series with a power supply and to other instrumentation forming a series loop for remote indication, alarm functions and control.

Typically, each storage tank 17, 19 is measured and indicated separately. To indicate total volume, which is the sum of both tanks, the top 21 and bottom 23 transmitters are coupled in series. However, each transmitter must be weighted or balanced regarding their span. The top transmitter 21 has a span $R_t$ corresponding to measurement and resistance. The bottom transmitter 23 has a span $R_b$. Therefore, the combined resistance to indicate full-scale when both tanks are filled to capacity is $$Rg = Rt + Rb \qquad (1)$$

where Rg is the sum total. If the expected transmitter resistance is 180 Ω (what the instrument loop expects), 180 Ω must be balanced between each transmitter, as the top tank 17 drains first, then the bottom tank 19. To weight each transmitter, each tank volume must be considered. For the top transmitter 21, $$Rt = \frac{Vt}{(Vt + Vb)} \times 180 \, \Omega \qquad (2)$$

where $V_t$ is the volume of the top tank 17, $V_b$ is the volume of the bottom tank 19 and $R_t$ is the derived span resistance for the top tank.

For the bottom transmitter, $$Rb = \frac{Vb}{(Vt + Vb)} \times 180 \, \Omega \qquad (3)$$

where $V_t$ is the volume of the top tank 17, $V_b$ is the volume of the bottom tank 19 and $R_b$ is the derived span resistance for the bottom tank.

For example, if a top tank 17 holds 50 gallons and a bottom tank 19 holds 100 gallons, $$Rt = 60\Omega = \frac{50 \text{ gal}}{(50 \text{ gal} + 100 \text{ gal})} \times 180 \, \Omega, \text{ and} \qquad (2)$$

$$Rb = 120\Omega = \frac{100 \text{ gal}}{(50 \text{ gal} + 100 \text{ gal})} \times 180 \, \Omega, \qquad (3)$$

and $R_g$ equals 180 Ω when both tanks are to full capacity equaling 150 gallons full scale 27. Continuing with the example, when the top storage tank is emptied, $R_t$ equals 0 Ω, while $R_b$ equals 120 Ω, indicating ⅔ of full scale or 100 gallons. For this example, the resistance Ω for the minimum limit for each transmitter is suppressed (set to zero).

If both transmitters maintain a minimum limit resistance of 10 Ω, and a maximum of 180 Ω, the span is 170 Ω. For the example discussed above $$Rt = 56.66\Omega = \frac{50 \text{ gal}}{(50 \text{ gal} + 100 \text{ gal})} \times 170 \, \Omega \text{ and,} \qquad (2)$$

$$Rb = 113.33\Omega = \frac{100 \text{ gal}}{(50 \text{ gal} + 100 \text{ gal})} \times (170 \, \Omega). \qquad (3)$$

Both 10 Ω minimum limits are constants yielding a 20 Ω elevated zero on all loop instrumentation. Transmitter 21, 23 failures would show as under-range (<0 gallons) or over-range (>150 gallons) indication 27.

Equations 2 and 3 can be expanded for a plurality of storage tanks. To balance the level instrument loop i for all tanks requires deriving a weighting factor for each respective tank by dividing its respective volume by the sum of all tank volumes. Each level transmitter can have its minimum limit preserved necessitating an elevated zero percent measurement. In the alternative, the minimum limit resistance can be suppressed.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A method of measuring total capacity for a plurality of storage tanks comprising:

deriving a weighting factor for each one of the plurality of storage tanks;

determining an overall transmitter resistance for the total capacity measurement; and multiplying each one of said storage tank weighting factors with said overall resistance yielding a span resistance corresponding to each one of the plurality of storage tanks.

2. The method according to claim 1 further comprising:

coupling a transmitter mounted on each one of said plurality of storage tanks in a series loop whereby each said transmitter has said span resistance corresponding to said tank mounted thereon.

3. The method according to claim 2 wherein said step of deriving a weighting factor further comprises:

adding the capacities of all of the plurality of storage tanks as a sum total capacity; and dividing each storage tank capacity from the plurality of storage tanks by said sum total capacity.

4. A total capacity measurement system for a plurality of storage tanks comprising:

a transmitter mounted on each one of the plurality of storage tanks for measuring a respective storage tank capacity;

an overall span resistance;

a corresponding weighting factor applied to each said transmitter to determine a transmitter span resistance; and a power supply and indicator coupled in series with each of said transmitters whereby total storage tank capacity is measured using each of said transmitter span resistances wherein all of said span resistances equal said overall span resistance.

5. The system according to claim 4 wherein each of said corresponding weighting factors are determined by a respective storage tank capacity divided by a sum total of all of the plurality of storage tank capacities.

6. A system of measuring total capacity for a plurality of storage tanks comprising:

means for deriving a weighting factor for each one of the plurality of storage tanks;

means for determining an overall transmitter resistance for the total capacity measurement; and means for multiplying each one of said storage tank weighting factors with said overall resistance yielding a span resistance corresponding to each one of the plurality of storage tanks.

7. The system according to claim 6 further comprising:

means for coupling a transmitter mounted on each one of said plurality of storage tanks in a series loop whereby each said transmitter has said span resistance corresponding to said tank mounted thereon.

8. The system according to claim 7 wherein said step of deriving a weighting factor further comprises:

means for adding the capacities of all of the plurality of storage tanks as a sum total capacity; and means for dividing each storage tank capacity from the plurality of storage tanks by said sum total capacity.

* * * * *